(12) United States Patent
Gleason et al.

(10) Patent No.: US 8,372,928 B2
(45) Date of Patent: Feb. 12, 2013

(54) HARD, IMPERMEABLE, FLEXIBLE AND CONFORMAL ORGANIC COATINGS

(75) Inventors: Karen K. Gleason, Lexington, MA (US); Jingjing Xu, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 89 days.

(21) Appl. No.: 13/112,489

(22) Filed: May 20, 2011

(65) Prior Publication Data
US 2012/0296033 A1 Nov. 22, 2012

(51) Int. Cl.
C08F 34/02 (2006.01)
C08F 12/02 (2006.01)
C08F 112/06 (2006.01)
G03F 7/00 (2006.01)

(52) U.S. Cl. ...... 526/271; 526/346; 526/347.1; 430/315

(58) Field of Classification Search ......... 526/271, 526/346, 347.1; 430/315
See application file for complete search history.

(56) References Cited

U.S. PATENT DOCUMENTS
2007/0297944 A1* 12/2007 Wendland et al. .......... 422/56
* cited by examiner Primary Examiner — William Cheung
(74) Attorney, Agent, or Firm — Foley Hoag LLP

(57) ABSTRACT

Disclosed is a substantially alternating copolymer that is conformal, hard, flexible, and has low oxygen permeability. Also disclosed is an iCVD-based method of coating a substrate with the substantially alternating copolymer.

31 Claims, 4 Drawing Sheets

HARD, IMPERMEABLE, FLEXIBLE AND CONFORMAL ORGANIC COATINGS

GOVERNMENT SUPPORT

This invention was made with government support under grant number N00014-97-1-0197 awarded by the Navy, and grant number CHE9421982 awarded by the NSF. The government has certain rights in this invention.

BACKGROUND OF THE INVENTION

A polymer may be deposited using chemical vapor deposition (CVD) techniques, including plasma enhanced chemical vapor deposition (PECVD), atomic layer deposition (ALD), hot-wire chemical vapor deposition (HWCVD), and initiated chemical vapor deposition (iCVD) techniques.

iCVD is considered to be a subset of HWCVD in which selective thermal decomposition of species is achieved using resistively-heated filament wires. Substrates are generally backside cooled to promote absorption of growth species. iCVD differs from HWCVD in that an initiator in addition to the monomer is introduced into the vacuum chemical vapor deposition chamber. Initiators are generally selected such that low filament temperatures are required to generate radicals for initiation. The radicals serve as starters for polymer chains to which multiple monomer units are added.

The use of an initiator not only allows control of chemistry, but also accelerates film growth and provides molecular-weight and deposition rate control. The energy input is low due to the low filament temperature and the need only to decompose the initiator not the monomer. Radicals in the iCVD process are annihilated through termination. Both disproportionation and coupling reactions eliminate radicals and halt addition of monomer units to the chains. The recombination of radicals avoids the presence of dangling bond defects in the resulting polymeric film.

The iCVD growth of the polymer involves forming a reactive process gas by flowing a gaseous monomer into a process chamber, flowing a gaseous initiator through a heated filament into the process chamber, exposing a substrate to the reactive process gas, and thermally decomposing the process gas by flowing the process gas over resistively-heated filament wires for a period of time to deposit the polymer on the substrate.

Characteristics of the polymer structure, such as thickness and conformality with underlying structures, may be controlled by the iCVD growth parameters. These growth parameters include but are not limited to monomer source gas, initiator source gas, chamber temperature, filament temperature, growth pressure, and growth time. Generally, the growth parameters are selected such that the polymer forms a conformal layer over the underlying structure.

Initiated chemical vapor deposition is capable of producing a range of polymeric and multifunctional nanocoatings. Coatings can be made extremely thin (down to about 10 nm) on objects with dimensions in the nanometer range (e.g., carbon nanotubes). Importantly, the object to be coated can remain at room temperature, which means that nanothin coatings can be prepared on materials ranging from plastics to metals. The process is also conformal, which means it provides uniform coverage on objects which have small, complex, three-dimensional geometries.

Initiated CVD generally takes place in a reactor. Precursor molecules, consisting of initiator and monomer species, are fed into the reactor. This can take place at a range of pressures from atmospheric pressure to low vacuum. An extremely thin, conformal layer of monomer molecules continually adsorbs to the substrate surface. The initiator is broken down through the addition of thermal energy or radiative energy (UV) to form free radicals, which subsequently add to a monomer molecule and cause polymerization to proceed in a manner analogous to well-known solution polymerization. In this manner, complex substrates can be conformably coated. During the deposition the substrate is kept at a relatively low temperature, generally room temperature up to about 60° C. The process is solvent-free. The iCVD process can also use plasma excitation to generate initiating free radicals. This can be done by flowing gas-phase monomer or by atomization of the liquid monomer species through a plasma field. This can take place at a range of pressures from atmospheric pressure to low vacuum.

SUMMARY OF THE INVENTION

One aspect of the invention relates to an article, comprising a substrate, and a coating comprising a substantially alternating copolymer; wherein said substantially alternating copolymer comprises a first monomer and a second monomer; the first monomer is 4-aminostyrene; and the second monomer is maleic anhydride.

One aspect of the invention relates to an article, consisting essentially of a substrate, and a coating comprising a substantially alternating copolymer; wherein said substantially alternating copolymer consists essentially of a first monomer and a second monomer; the first monomer is 4-aminostyrene; and the second monomer is maleic anhydride.

One aspect of the invention relates to an article, consisting of a substrate, and a coating comprising a substantially alternating copolymer; wherein said substantially alternating copolymer consists of a first monomer and a second monomer; the first monomer is 4-aminostyrene; and the second monomer is maleic anhydride.

In certain embodiments, the present invention relates to any one of the aforementioned articles, wherein the coating has oxygen permeability between about $5 \times 10^{-6}$ and about $0.05 \times 10^{-6}$ Barrers.

In certain embodiments, the present invention relates to any one of the aforementioned articles, wherein the coating has hardness between about 0.1 GPa and about 0.6 GPa.

In certain embodiments, the present invention relates to any one of the aforementioned articles, wherein the coating has an elastic modulus between about 5 GPa and about 25 GPa.

In certain embodiments, the present invention relates to any one of the aforementioned articles, wherein the coating has an elastic modulus between about 10 GPa and about 20 GPa.

Another aspect of the invention relates to a method of coating a substrate, comprising the steps of:

placing a substrate on a stage in a vessel at a pressure; wherein said vessel comprises a heating filament; and the temperature of said stage may be regulated;

introducing into the vessel a first gaseous monomer at a first flow rate, a second gaseous monomer at a second flow rate, and a gaseous initiator at a third flow rate, thereby forming a mixture; and heating said mixture with said heating filament, thereby depositing a coating of a substantially alternating copolymer on the substrate;

wherein the first monomer is 4-aminostyrene; and the second monomer is maleic anhydride.

In certain embodiments, the present invention relates to any one of the aforementioned methods, wherein the substantially alternating copolymer comprises 4-aminostyrene and maleic anhydride.

In certain embodiments, the present invention relates to any one of the aforementioned methods, wherein the substantially alternating copolymer consists essentially of 4-aminostyrene and maleic anhydride.

In certain embodiments, the present invention relates to any one of the aforementioned methods, wherein the substantially alternating copolymer consists of 4-aminostyrene and maleic anhydride.

In certain embodiments, the present invention relates to any one of the aforementioned methods, wherein said gaseous initiator is selected from the group consisting of hydrogen peroxide, alkyl peroxides, aryl peroxides, hydroperoxides, halogens and nonoxidizing initiators.

In certain embodiments, the present invention relates to any one of the aforementioned methods, wherein said gaseous initiator is selected from the group consisting of tert-butyl peroxide, tert-amyl peroxide, and tert-butyl peroxybenzoate.

In certain embodiments, the present invention relates to any one of the aforementioned methods, further comprising the step of annealing the substantially alternating copolymer for a period of time.

In certain embodiments, the present invention relates to any one of the aforementioned methods, wherein the annealing step is at a temperature between about 50° C. and about 150° C.

In certain embodiments, the present invention relates to any one of the aforementioned methods, wherein the annealing step is at a temperature between about 75° C. and about 125° C.

In certain embodiments, the present invention relates to any one of the aforementioned methods, wherein the annealing step is at a temperature between about 95° C. and about 105° C.

In certain embodiments, the present invention relates to any one of the aforementioned methods, wherein the annealing period of time is between about 1 hour and about 50 hours.

In certain embodiments, the present invention relates to any one of the aforementioned methods, wherein the annealing period of time is between about 5 hours and about 45 hours.

In certain embodiments, the present invention relates to any one of the aforementioned methods, wherein the annealing period of time is between about 10 hours and about 40 hours.

In certain embodiments, the present invention relates to any one of the aforementioned methods, wherein the annealing period of time is between about 20 hours and about 30 hours.

In certain embodiments, the present invention relates to any one of the aforementioned methods, wherein the annealing period of time is between about 22 hours and about 28 hours.

In certain embodiments, the present invention relates to any one of the aforementioned methods, wherein the pressure in the vessel is between about 100 mTorr and about 800 Torr.

In certain embodiments, the present invention relates to any one of the aforementioned methods, wherein the pressure in the vessel is between about 250 mTorr and about 400 Torr.

In certain embodiments, the present invention relates to any one of the aforementioned methods, wherein the pressure in the vessel is between about 500 mTorr and about 200 Torr.

In certain embodiments, the present invention relates to any one of the aforementioned methods, wherein the pressure in the vessel is between about 750 mTorr and about 100 Torr.

In certain embodiments, the present invention relates to any one of the aforementioned methods, wherein the first flow rate is between about 10 sccm and about 0.05 sccm.

In certain embodiments, the present invention relates to any one of the aforementioned methods, wherein the first flow rate is between about 8 sccm and about 0.1 sccm.

In certain embodiments, the present invention relates to any one of the aforementioned methods, wherein the first flow rate is between about 6 sccm and about 0.15 sccm.

In certain embodiments, the present invention relates to any one of the aforementioned methods, wherein the second flow rate is between about 10 sccm and about 0.05 sccm.

In certain embodiments, the present invention relates to any one of the aforementioned methods, wherein the second flow rate is between about 8 sccm and about 0.1 sccm.

In certain embodiments, the present invention relates to any one of the aforementioned methods, wherein the second flow rate is between about 6 sccm and about 0.15 sccm.

In certain embodiments, the present invention relates to any one of the aforementioned methods, wherein the third flow rate is between about 7 sccm and about 0.1 sccm.

In certain embodiments, the present invention relates to any one of the aforementioned methods, wherein the third flow rate is between about 5 sccm and about 0.3 sccm.

In certain embodiments, the present invention relates to any one of the aforementioned methods, wherein the third flow rate is between about 3 sccm and about 0.5 sccm.

In certain embodiments, the present invention relates to any one of the aforementioned methods, wherein the temperature of the stage is between about 20° C. and about 80° C.

In certain embodiments, the present invention relates to any one of the aforementioned methods, wherein the temperature of the stage is between about 30° C. and about 70° C.

In certain embodiments, the present invention relates to any one of the aforementioned methods, wherein the temperature of the stage is between about 40° C. and about 60° C.

In certain embodiments, the present invention relates to any one of the aforementioned methods, wherein the temperature of the heating filament is between about 100° C. and about 600° C.

In certain embodiments, the present invention relates to any one of the aforementioned methods, wherein the temperature of the heating filament is between about 150° C. and about 450° C.

In certain embodiments, the present invention relates to any one of the aforementioned methods, wherein the temperature of the heating filament is between about 200° C. and about 300° C.

DETAILED DESCRIPTION OF THE INVENTION

Figure 1:
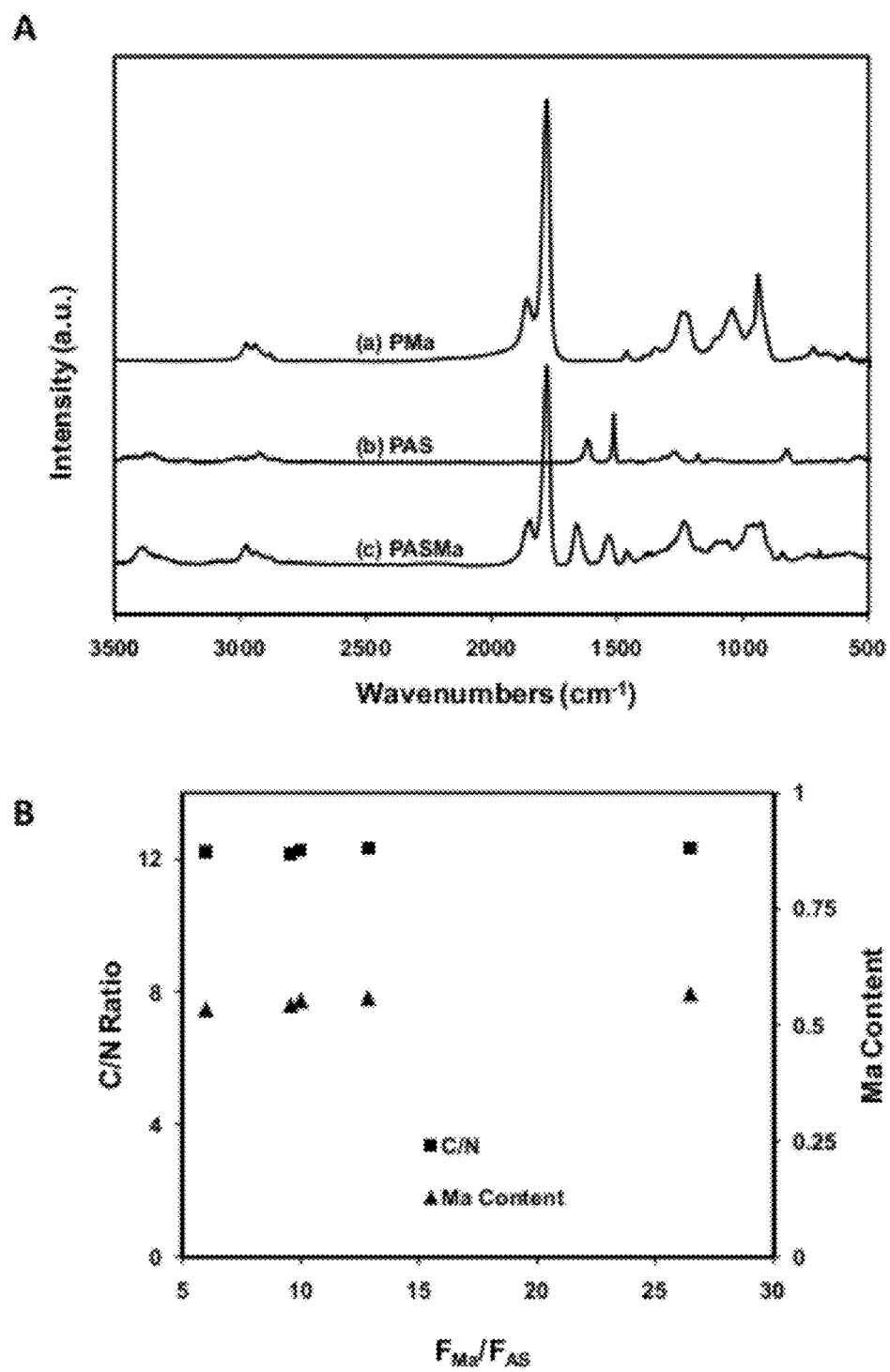
FIGS. 1A and 1B depict FTIR and XPS spectra of various coatings of the present invention.

Initiated chemical vapor deposition (iCVD) provides a uniform or substantially uniform coating on rough, fibrous, and porous morphologies with high surface areas. The iCVD coating process is compatible with a variety of organic and inorganic materials since it does not depend on evenly wetting the substrate surface. Importantly, the iCVD technique eliminates wet-processing steps which can damage some electronic devices and organic membranes through the wetting or the spin-coating process typically used to apply solution-based films.

As mentioned above, iCVD bypasses the use of a liquid solvent phase. This feature is a significant advantage because liquid-based methods which rely on drying a wet polymer solution often suffer from particle agglomeration as a result of strong liquid surface tension forces and increasing polymer viscosity during drying, which create liquid bridges that bind the particles together, especially when particles fall below 100 µm in size. [Link, K. C. & Schlunder, E. U. Fluidized bed spray granulation—investigation of the coating process on a single sphere. *Chem. Eng. Process.* 36, 443-457 (1997); and Kage, H. et al. Effect of solid circulation rate on coating efficiency and agglomeration in circulating fluidized bed type coater. *Powder Technol.* 130, 203-210 (2003).]

The iCVD coating process can take place at a range of pressures from atmospheric pressure to low vacuum. The operating pressure can be selected to provide a suitable environment for coating extremely fine objects. In certain embodiments, the operating pressure is in the range of about 100 mTorr to about 800 Torr. In certain embodiments, the operating pressure is in the range of about 250 mTorr to about 400 Torr. In certain embodiments, the operating pressure is in the range of about 500 mTorr to about 200 Torr. In certain embodiments, the operating pressure is in the range of about 750 mTorr to about 100 Torr. In certain embodiments, the pressure of the deposition chamber is about 0.1 Torr, about 0.2 Torr, about 0.3 Torr, about 0.4 Torr, about 0.5 Torr, about 0.6 Torr, about 0.7 Torr, about 0.8 Torr, about 0.9 Torr, or about 1.0 Torr. In certain embodiments, the pressure of the deposition chamber is about 2 Torr, about 3 Torr, about 4 Torr, about 5 Torr, about 6 Torr, about 7 Torr, about 8 Torr, about 9 Torr, or about 10 Torr. In certain embodiments, the pressure of the deposition chamber is about 20 Torr, about 30 Torr, about 40 Torr, about 50 Torr, about 60 Torr, about 70 Torr, about 80 Torr, about 90 Torr, or about 100 Torr. In certain embodiments, the pressure of the deposition chamber is about 200 Torr, about 300 Torr, about 400 Torr, about 500 Torr, about 600 Torr, about 700 Torr, or about 800 Torr.

The flow rate of the first monomer can be varied in the iCVD method. In certain embodiments, the flow rate of the first monomer is about 10 sccm. In other embodiments, the flow rate is less than about 10 sccm. In certain embodiments, the flow rate of the first monomer is in the range of about 10 sccm to about 0.05 sccm. In certain embodiments, the flow rate of the first monomer is in the range of about 8 sccm to about 0.1 sccm. In certain embodiments, the flow rate of the first monomer is in the range of about 6 sccm to about 0.15 sccm. In certain embodiments, the flow rate of the first monomer is about 9 sccm, about 8 sccm, about 7 sccm, about 6 sccm, about 5 sccm, about 4 sccm, about 3 sccm, about 2 sccm, or about 1 sccm. In certain embodiments, the flow rate of the first monomer is about 0.8 sccm, about 0.6 sccm, about 0.4 sccm, about 0.2 sccm, about 0.1 sccm, or about 0.05 sccm. When more than one monomer is used (i.e. to deposit copolymers), the flow rate of the first monomer and the second monomer, are independently selected.

The flow rate of the second monomer can be varied in the iCVD method. In certain embodiments, the flow rate of the second monomer is about 10 sccm. In other embodiments, the flow rate is less than about 10 sccm. In certain embodiments, the flow rate of the second monomer is in the range of about 10 sccm to about 0.05 sccm. In certain embodiments, the flow rate of the second monomer is in the range of about 8 sccm to about 0.1 sccm. In certain embodiments, the flow rate of the second monomer is in the range of about 6 sccm to about 0.15 sccm. In certain embodiments, the flow rate of the second monomer is about 9 sccm, about 8 sccm, about 7 sccm, about 6 sccm, about 5 sccm, about 4 sccm, about 3 sccm, about 2 sccm, or about 1 sccm. In certain embodiments, the flow rate of the second monomer is about 0.8 sccm, about 0.6 sccm, about 0.4 sccm, about 0.2 sccm, about 0.1 sccm, or about 0.05 sccm.

The flow rate of the initiator can be varied in the iCVD method. In certain embodiments, the flow rate of the initiator is about 10 sccm. In other embodiments, the flow rate is less than about 10 sccm. In certain embodiments, the flow rate of the initiator is in the range of about 7 sccm to about 0.1 sccm. In certain embodiments, the flow rate of the initiator is in the range of about 5 sccm to about 0.3 sccm. In certain embodiments, the flow rate of the initiator is in the range of about 3 sccm to about 0.5 sccm. In certain embodiments, the flow rate of the initiator is about 9 sccm, about 8 sccm, about 7 sccm, about 6 sccm, about 5 sccm, about 4 sccm, about 3 sccm, about 2 sccm, or about 1 sccm. In certain embodiments, the flow rate of the initiator is about 0.8 sccm, about 0.6 sccm, about 0.4 sccm, about 0.2 sccm, about 0.1 sccm, or about 0.05 sccm.

The temperature of the filament can be varied in the iCVD method. In certain embodiments, the temperature of the filament is less than 600° C. In certain embodiments, the temperature of the filament is less than 500° C. In certain embodiments, the temperature of the filament is less than 400° C. In certain embodiments, the temperature of the filament is less than 300° C. In certain embodiments, the temperature of the filament is less than 200° C. In certain embodiments, the temperature of the filament is less than 100° C. In certain embodiments, the temperature of the filament is in the range of about 100° C. to about 600° C. In certain embodiments, the temperature of the filament is in the range of about 150° C. to about 450° C. In certain embodiments, the temperature of the filament is in the range of about 200° C. to about 300° C.

The iCVD coating process can take place at a range of temperatures. In certain embodiments, the temperature of the substrate is ambient temperature. In certain embodiments, the temperature is about 20° C. In certain embodiments, the temperature is about 30° C. In certain embodiments, the temperature is about 40° C. In certain embodiments, the temperature is about 50° C. In certain embodiments, the temperature is about 60° C. In certain embodiments, the temperature is about 70° C. In certain embodiments, the temperature is about 80° C. In certain embodiments, the temperature of the substrate is in the range of about 20° C. to about 80° C. In certain embodiments, the temperature of the substrate is in the range of about 30° C. to about 70° C. In certain embodiments, the temperature of the substrate is in the range of about 40° C. to about 60° C.

In certain embodiments, the rate of polymer deposition is about 1 micron/minute. In certain embodiments, the rate of polymer deposition is between about 1 micron/minute and about 50 nm/minute. In certain embodiments, the rate of polymer deposition is between about 10 micron/minute and about 50 nm/minute. In certain embodiments, the rate of polymer deposition is between about 100 micron/minute and about 50 nm/minute. In certain embodiments, the rate of polymer deposition is between about 1 nm/minute and about 50 nm/minute. In certain embodiments, the rate of polymer deposition is between about 10 nm/minute and about 50 nm/minute. In certain embodiments, the rate of polymer deposition is between about 10 nm/minute and about 25 nm/minute. In certain embodiments, rate of polymer deposition is about 10 micron/minute, about 20 micron/minute, about 30 micron/minute, about 40 micron/minute, about 50 micron/minute, about 60 micron/minute, about 70 micron/minute, about 80 micron/minute, about 90 micron/minute, or about 100 micron/minute. In certain embodiments, rate of polymer deposition is about 200 micron/minute, about 300 micron/minute, about 400 micron/minute, about 500 micron/minute, about 600 micron/minute, about 700 micron/minute, about 800 micron/minute, about 900 micron/minute, or about 1 nm/minute. In certain embodiments, rate of polymer deposition is about 2 nm/minute, about 3 nm/minute, about 4 nm/minute, about 5 nm/minute, about 6 nm/minute, about 7 nm/minute, about 8 nm/minute, about 9 nm/minute, about 10 nm/minute, about 11 nm/minute, about 12 nm/minute, about 13 nm/minute, about 14 nm/minute, about 15 nm/minute, about 16 nm/minute, about 17 nm/minute, about 18 nm/minute, about 19 nm/minute, or about 20 nm/minute. In certain embodiments, rate of polymer deposition is about 21 nm/minute, about 22 nm/minute, about 23 nm/minute, about 24 nm/minute, about 25 nm/minute, about 26 nm/minute, about 27 nm/minute, about 28 nm/minute, about 29 nm/minute, or about 30 nm/minute. In certain embodiments, the rate of polymer deposition is about 32 nm/minute, about 34 nm/minute, about 36 nm/minute, about 38 nm/minute, about 40 nm/minute, about 42 nm/minute, about 44 nm/minute, about 46 nm/minute, about 48 nm/minute, or about 50 nm/minute.

In certain embodiments, the coating can be annealed at a temperature. In certain embodiments, the temperature is in the range of about 50° C. to about 150° C. In certain embodiments, the temperature is in the range of about 75° C. to about 125° C. In certain embodiments, the temperature is in the range of about 95° C. to about 105° C. In certain embodiments, the temperature is about 50° C., about 60° C., about 70° C., about 80° C., about 90° C., or about 100° C. In certain embodiments, the temperature is about 110° C., about 120° C., about 130° C., about 140° C., or about 150° C.

In certain embodiments, the coating can be annealed for a period of time. In certain embodiments, the period of time is about an hour. In certain embodiments, the period of time less than about 50 hours. In certain embodiments, the time is in the range of about 1 hour to about 50 hours. In certain embodiments, the time is in the range of about 5 hours to about 45 hours. In certain embodiments, the time is in the range of about 10 hours to about 40 hours. In certain embodiments, the time is in the range of about 20 hours to about 30 hours. In certain embodiments, the time is in the range of about 22 hours to about 28 hours. In certain embodiments, the period of time is about 2 hours, about 4 hours, about 6 hours, about 8 hours, about 10 hours, about 12 hours, about 14 hours, about 16 hours, about 18 hours, about 20 hours, about 22 hours, or about 24 hours. In certain embodiments, the period of time is about 26 hours, about 28 hours, about 30 hours, about 32 hours, about 34 hours, about 36 hours, about 38 hours, about 40 hours, about 42 hours, about 44 hours, about 46 hours, or about 48 hours.

An auxiliary gas may be used with the monomer source gases to facilitate the growth process. The auxiliary gas may comprise one or more gases, such as carrier gases, inert gases, reducing gases (e.g., hydrogen, ammonia), dilution gases, or combinations thereof, for example. The term "carrier gas" is sometimes used in the art to denote inert gases, reducing gases, and combinations thereof. Some examples of carrier gases are hydrogen, nitrogen, argon, and ammonia.

The growth time or "residence time" depends in part on the desired thickness of the polymer film, with longer growth times producing a thicker film. The growth time may range from about ten seconds to many hours, but more typically from about ten minutes to several hours.

In one embodiment, the distance from the substrate to the filament is about 10 cm, about 9 cm, about 8 cm, about 7 cm, about 6 cm, or about 5 cm. In other embodiments, the distance from the substrate to the filament is about 4 cm, about 3 cm, about 2 cm or about 1 cm. In certain embodiments, the distance is in the range of about 10 cm to about 1 cm. In certain embodiments, the distance is in the range of about 9 cm to about 2 cm. In certain embodiments, the distance is in the range of about 8 cm to about 3 cm.

To achieve conformal organic coatings, we will utilize the method of initiated chemical vapor deposition (iCVD), which involves the delivery of vapor-phase monomers to form chemically well-defined polymer films with tunable conformality and properties. (Tenhaeff, W. E. and Gleason, K. K. *Advanced Functional Materials* 2008, 18, 979-992.; Asatekin, A et al. *Materials Today* 2010, 13, 26-33.) The iCVD method is chemically analogous to solution phase polymerization, but possesses a number of practical advantages. It is able to deposit conformal and pinhole-free coatings on non-planar substrates with nanometer level thickness control. In addition, elimination of solvent usage makes the iCVD method compatible with a wide range of substrate materials which swell or dissolve in solution. Furthermore, as a low-energy vapor deposition process, the iCVD process is able to maintain the functionalities from the monomers, which is crucial for subsequent fuctionalization.

Our approach is to first to grow iCVD copolymer thin films, and then to react all the pendant groups of the two different monomeric units with one another to form a massively cross-linked network. We hypothesize that an alternating copolymer will result in a higher probability for reaction between unlike pendant groups than would a random copolymer. Organic polymers and inorganic materials are typically prized for different characteristics. While organic polymers are generally more flexible, inorganics commonly have far higher values of modulus and hardness, and also display greater scratch and abrasion resistance. (Berggren, M.; Nilsson, D.; Robinson, N. D. *Nature Materials* 2007, 6, 3-5; van Bommel, K. J. C.; Friggeri, A.; Shinkai, S. *Angewandte Chemie-International Edition* 2003, 42, 980-999). Additionally, while organic polymers often display high values of gas permeability, many different inorganics act as barriers against the transmission of species like oxygen gas and water vapor. Inorganics lack organic functional groups that provide access to a rich array of chemical modification capabilities, which is highly desirable for tuning surface energy (e.g., hydrophilic, hydrophobic), for enabling subsequent chemical attachment of molecules (e.g., chemical dyes, growth factors, antibodies), and for covalently binding micro- or nano-particles to the surface. (Tuteja, A et al. *Science* 2007, 318, 1618-1622; Zammatteo, N. et al. *Analytical Biochemistry* 2000, 280, 143-150; Brust, M. et al. *Langmuir* 1998, 14, 5425-5429). Hybrid materials, which combine organic and inorganic elements, are widely used to prepare tough and durable coatings. Sol-gel process is known to be one of the practical methods for preparing organic-inorganic hybrid materials from alkoxysilanes. (Chung, J. et al. *Korean Journal of Chemical Engineering* 2004, 21, 132-139). As a wet-chemistry based method, it cannot be applied to substrates that swell or dissolve upon exposure to solvents. It also normally does not exhibit good conformality due to surface tension effects. Increasing the number of cross-links between the inorganic and organic phases increases the young's modulus but decreases the flexibility. (Novak, B. M. *Advanced Materials* 1993, 5, 422-433). Young's moduli (6 to 8.7 GPa) have been determined for organic-inorganic hybrid nano-composites prepared by sol-gel condensation of bismethacrylatesilanes. (Muh, E. et al. *Advanced Functional Materials* 2001, 11, 425-429).

Increasing Young's modulus and hardness improves durability of coatings and their capacity to protect the underlying substrate. Reducing gas permeability is of value for creating barrier layers suitable for electronics packaging, food or flat panel display industries. For such practical applications, the substrates are often non-planar, making it highly desirable to produce protective coating layers which conform to the overall geometry and features of the substrate. (Cheyns, D. et al. *Nanotechnology* 2008, 19, 6; Binh-Khiem, N.; Matsumoto, K.; Shimoyama, I. *Applied Physics Letters* 2008, 93, 3; Hozumi, A.; Takai, O. *Applied Surface Science* 1996, 103, 431-441). In this current work, we seek to demonstrate a new materials design paradigm to achieve conformal, all-organic coatings that retain their flexibility and functional group chemistry while simultaneously displaying properties more typically associated with inorganics, including mechanical hardness and barrier properties.

Owing to the structural constraints imposed by their covalent bonding networks, inorganic materials are typically hard and impermeable, but relatively brittle. On the other hand, organic materials are often flexible, but are relatively soft and permeable. Here we design, synthesize, and characterize a conformal organic coating which is hard and impermeable, yet remains flexible. First, initiated chemical vapor deposition (iCVD) is used to synthesize a novel alternating copolymer thin film from maleic anhydride and aminostyrene. Upon annealing at 100° C., the functional groups of the two monomers react, resulting in extensive cross-linking. The annealed copolymer films display an elastic modulus exceeding 20 GPa, far greater than typical polymers (0.5~5 GPa). The scratch resistance improves dramatically after annealing and the scratch depth decreases from 48 nm to 6 nm. Moreover, the cross-linked films maintain their flexibility, neither cracking nor delaminating with repeated flexing. This achievement represents a significant advance in the fabrication of tough, durable, conformal, functional coatings. Furthermore, the highly cross-linked coating material has oxygen permeability lower than leading commercially available permeation barrier films, making it an attractive material for electronics or food industries.

EXPERIMENTAL

All iCVD films were deposited in a custom vacuum reactor, as previously described. (Baxamusa, S. H. et al. *Biomacromolecules* 2008, 9, 2857-2862). Thermal excitation was provided by heating a nichrome filament (80% Ni/20% Cr) mounted in a parallel array and the temperature was measured by a thermal couple attached to one of the filaments. The filament holder straddled the deposition stage maintained at a set point temperature using water cooling. The vertical distance between the filament and the stage was 2 cm. A butterfly-type throttling valve (Type 652B, MKS) was used to maintain the pressure. All the chemicals were used as purchased without further purification. Tert-butyl peroxide (Aldrich, 97%) initiator, at room temperature, was fed to the reactor through a mass flow controller (model 1179A, MKS) at 0.85 sccm. 4-Aminostyrene (4-AS) (Aldrich, 97%) monomer, heated to 85±3° C. in a glass jar, was delivered into the reactor at controlled flow rates via a different port. Maleic Anhydride (Ma) (Aldrich, 99%) was heated to 85° C. in a glass jar and then metered into the reactor through a mass flow controller (model 1152C, MKS). Films were deposited at a filament temperature of 260° C. and a stage temperature of 50° C. A nitrogen (ultrahigh purity, Airgas) patch flow was used to maintain the total flow rate at 6 sccm. The total pressure in the vacuum chamber was maintained at 0.9 Torr for all the depositions. iCVD deposition conditions utilizing the monomer 4-Aminostyrene (Aldrich, 97%) were adopted from previous work. (Xu, J. J.; Gleason, K. K. *Chemistry of Materials* 2010, 22, 1732-1738). Film growth on the Si substrate was monitored in situ through laser interferometry and controlled to a thickness of one micron for the mechanical property analysis and 200-250 nm for all other characterizations. A more accurate film thickness on the Si wafer substrates was measured post-deposition by a J. A. Woollam M-2000 spectroscopic ellipsometry at a 70° incidence angle using 190 wavelengths from 315 to 718 nm.

Fourier transform infrared (FTIR) measurements were performed on a Nicolet Nexus 870 ESP spectrometer in normal transmission mode. A deuterated triglycine sulfate (DTGS) KBr detector over the range of 400-4000 $cm^{-1}$ was utilized with a 4 $cm^{-1}$ resolution. Films were measured immediately after deposition and measurements were averaged over 64 scans to improve the signal-to-noise ratio. All spectra were baseline corrected by subtracting a background spectrum of the Si wafer substrate. X-ray photoelectron spectroscopy (XPS) survey spectrum was obtained on a Kratos Axis Ultra spectrometer with a monochromatized Al Kα source. Relative sensitivity factors were calibrated by measuring poly(N-isopropylacrylamide) polymer (Aldrich) spun-cast onto Si wafer. Deposition samples and the standard were stored under vacuum overnight prior to analysis.

TI-900 TriboIndenter (Hysitron) was used in the Nanoindentation and nanoscratch experiments. The indentation axis calibration was performed in air with a load increased up to 700 µN in 10 s and back to 0 µN in another 10 s. H calibration was conducted on an Aluminum sample to determine the optics-probe tip offset. The load function was adopted from previous work reported by Lee, but with a maximum load of 500 µN instead of 50 µN. (Lee, L. H.; Gleason, K. K. *Journal of the Electrochemical Society* 2008, 155, G78-G86). The moduli and hardnesses were obtained by using the triboindentor software. A 5×5 grid of indents was performed on every sample, with 20 µm separation distance in the x and y direction. For each indent, 8192 data points were taken. The load function for nanoscratch consists of five segments: (i) X position moves to −5 µm as normal load remains at zero, tracing across the surface at the setpoint, (ii) X position holds at −5 µm for 3 s and the normal load is ramped up to the scratching force of 2 mN during this hold, (iii) the X position moves from −5 µm to +5 µm for 30 s with the normal load held constant at 2 mN, (iv) X position holds again and the 2 mN load is removed during this time, (v) the X position returns to zero, the origin, and the normal load is at zero, to prevent deformation of the surface. Eight scratches with 20 µm separation were performed on every sample. Both nanoindentation and nanoscratch experiments were conducted on polymer film thicknesses of >1 µm to minimize any substrate impact, using a conical diamond tip (young's modulus=1140 GPa, Poisson ratio=0.07) with the radius of 10 µm. It is generally accepted that the substrate effect is minimal at indentation depths of less than 10% of the film thickness. (Oliver, W. C.; Pharr, G. M. *Journal of Materials Research* 1992, 7, 1564-1583). Area function of the diamond tip was determined by performing indentation on fused silica with a known modulus of 69.6 GPa. The load of the indentation was increased from 0.1 to 10 mN by 0.1 mN increments between neighboring indents. The area function was obtained by fitting the curves that have similar displacements as those values from indentation experiments.

Permeability measurements were performed using the apparatus developed in our laboratory. The procedures have been described in previous work. (Asatekin, A.; Gleason, K. K. *Nano Letters* 2011, 11, 677-686). The permeability coefficient P was calculated with the following equation, $$P = \frac{\Delta V}{\Delta t} \frac{L}{A\, p_1}$$

Where $\Delta V/\Delta t$ is the volumetric flow rate of the gas flow, L is the thickness of the film, A is the cross sectional area, $p_1$ is the upstream pressure of the permeant gas (the downstream pressure is atmospheric pressure). The permeability coefficient is expressed in Barrer, defined as 846 $cm^3 \cdot mm/(cm^2 \cdot day \cdot bar)$.

We have designed a new organic network structure utilizing the monomers 4-aminostyrene (4-AS) and maleic anhydride (Ma) as the precursors. Previous studies demonstrate that iCVD is able to achieve alternating copolymer thin films using Ma, an electron-accepting monomer, and styrene, an electron-donating monomer. (Tenhaeff, W. E.; Gleason, K. K. *Langmuir* 2007, 23, 6624-6630). 4-AS is structurally similar to styrene but with amine functionalities that can react with anhydride groups in Ma. (Padwa, A. R. et al. *Journal of Polymer Science Part a-Polymer Chemistry* 1995, 33, 2165-2174). This indicates the possibility to synthesize alternating self-cross-linking copolymer thin films in a single step with conformal coverage.

FIG. 1A shows the FTIR spectra of iCVD (a) poly(maleic anhydride) (PMa), (b) poly(4-aminostyrene) (PAS) homopolymer films, and (c) the as-deposited poly(4-aminostyrene-alt-maleic anhydride) (PASMa) copolymer film. The incorporation of Ma and 4-AS is confirmed by the C=O stretching (1870 and 1780 $cm^{-1}$) and the signature $NH_2$ antisymmetric and symmetric stretching (3420 and 3361 $cm^{-1}$) bands, respectively. In FIG. 1B, depositions for possible combinations of three 4-AS and three Ma flow rates were performed and the flow rates are provided in Table 1. Compositions of iCVD-deposited copolymer films were determined by XPS survey scans. All copolymer films have Ma mole percentage of 55.1±1.3%, irrespective of the ratio of Ma/4-AS flow rates. The ratio of carbon:nitrogen at the surface is 12.3:1, also in reasonable agreement with the theoretical ratio, 12:1. The independence of film compositions from gas phase composition is expected for an alternating copolymer, as was previously observed for iCVD poly(styrene-alt-maleic anhydride). (Tenhaeff, W. E. and Gleason, K. K., 2007).

TABLE 1

Experimental flow rate settings and corresponding partial pressure ratios

| | flow rates (sccm) | | | | | $P_m/P_{m,sat}$ | |
|---|---|---|---|---|---|---|---|
| sample | 4-AS | Ma | TBPO | $N_2$ | total | 4-AS | Ma |
| AS/Ma-2/0 | 0.17 | 0 | 0.85 | 4.98 | 6 | 0.11 | 0 |
| AS/Ma-4/0 | 0.35 | 0 | 0.85 | 4.8 | 6 | 0.22 | 0 |
| AS/Ma-5/0 | 0.47 | 0 | 0.85 | 4.68 | 6 | 0.30 | 0 |
| AS/Ma-0/2 | 0 | 2.1 | 0.85 | 3.05 | 6 | 0 | 0.25 |
| AS/Ma-0/4 | 0 | 3.5 | 0.85 | 1.65 | 6 | 0 | 0.41 |
| AS/Ma-0/5 | 0 | 4.5 | 0.85 | 0.65 | 6 | 0 | 0.53 |
| AS/Ma-4/2 | 0.35 | 2.1 | 0.85 | 2.7 | 6 | 0.22 | 0.25 |
| AS/Ma-4/4 | 0.35 | 3.5 | 0.85 | 1.3 | 6 | 0.22 | 0.41 |
| AS/Ma-4/5 | 0.35 | 4.5 | 0.85 | 0.3 | 6 | 0.22 | 0.53 |
| AS/Ma-2/5 | 0.17 | 4.5 | 0.85 | 0.48 | 6 | 0.11 | 0.53 |
| AS/Ma-5/5 | 0.47 | 4.5 | 0.85 | 0.18 | 6 | 0.30 | 0.53 |

Figure 5:
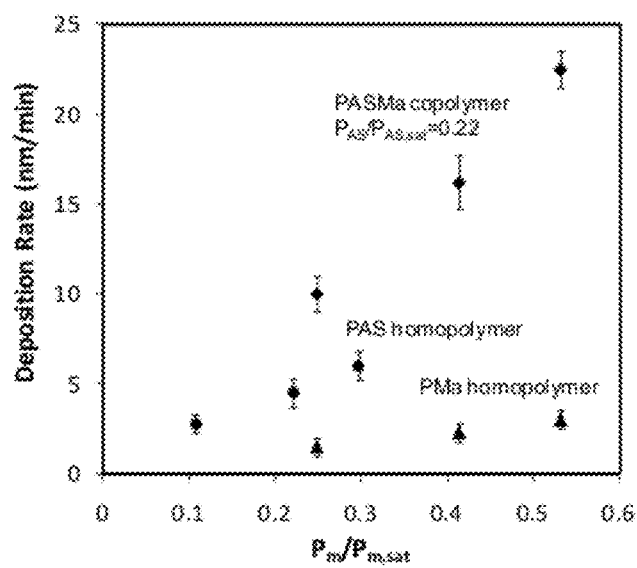
FIG. 5 depicts deposition rate as a function of monomer partial pressure ratio.

FIG. 5 depicts the film growth rate as a function of the partial pressures of two monomers maleic anhydride (Ma) and 4-aminostyrene (4-AS), holding all other iCVD process conditions constant. With pure MA or 4-AS only, the deposition rate is quite slow (<6 nm/min). The simultaneous introduction of both monomers leads to deposition rates as high as 22.5 nm/min. The improved kinetics is consistent with hypothesis that poly(4-aminostyrene-alt-maleic anhydride) (PASMa) is forming, driven by known complex formation between the electron-accepting Ma monomer, and 4-AS, an electron-donating monomer.[27] The alternating copolymer deposition rate can be varied by changing the monomer partial pressure.

Both FTIR and XPS confirm that iCVD produces an alternating copolymer from Ma and 4-AS and fully retains their pendant functional groups. This is the first time that amine-functional alternating copolymer thin films were synthesized via iCVD. This new material exhibits a self-cross-linking nature, due to the reaction between amine and anhydride functional groups.

Figure 2:
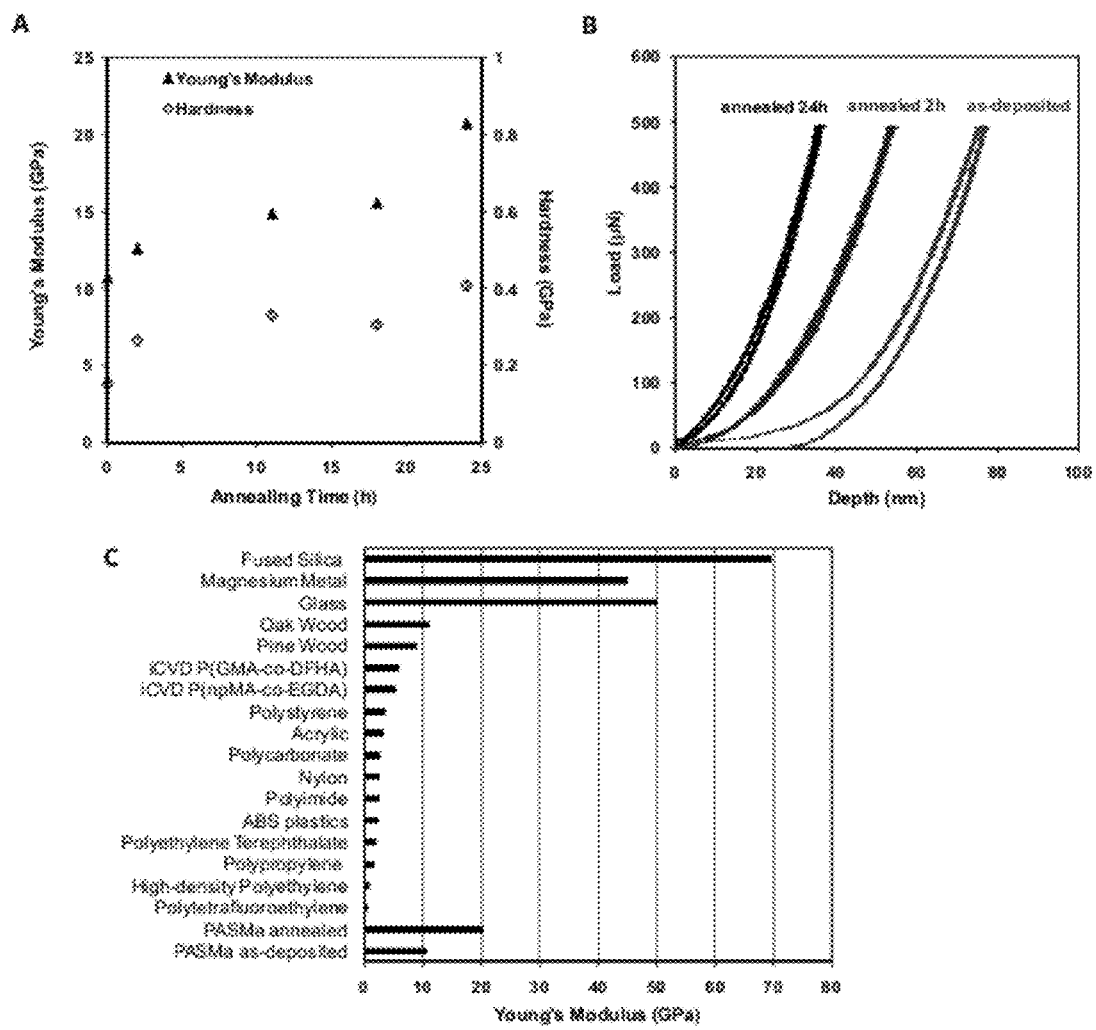
FIGS. 2A, 2B, and 2C represent the mechanical properties of various coatings of the present invention.

FIG. 2A shows that after annealing, the hardness and modulus of PASMa copolymer thin films increased by a factor of 2.7 and 1.9, respectively. This is consistent with the hypothesis that a highly cross-linked polymer network was formed. In nanoindentation testing, the annealed films also display a smaller hysteresis (FIG. 2B), reflecting a lower viscoelasticity. The hardness and the modulus were calculated from the load-displacement curves with the following equations (Li, X. D.; Bhushan, B. *Materials Characterization* 2002, 48, 11-36), $$H = \frac{P_{max}}{A(h_c)} \text{ and } E = \frac{\sqrt{\pi}}{2\sqrt{A(h_c)}} \cdot S$$

Where $P_{max}$ is the maximum load, $h_c$ is the contact depth and S is the contact stiffness. The area function $A(h_c)$ used in all calculations is the defined area function in the Hysitron software.

The copolymer films annealed for 24 hours display an elastic modulus exceeding 20 GPa, far greater than typical polymers (FIG. 2C). (ToolBox, E., p Retrieved March 2011, from http://www.engineeringtoolbox.com/young-modulus-d_417.html). Most polymers have modulus of 0.5~5 GPa and wood has modulus of 9~11 GPa. Even though fused silica is mechanically strong and has an elastic modulus of 69.5 GPa, it lacks organic functional groups and flexibility.

Figure 3:
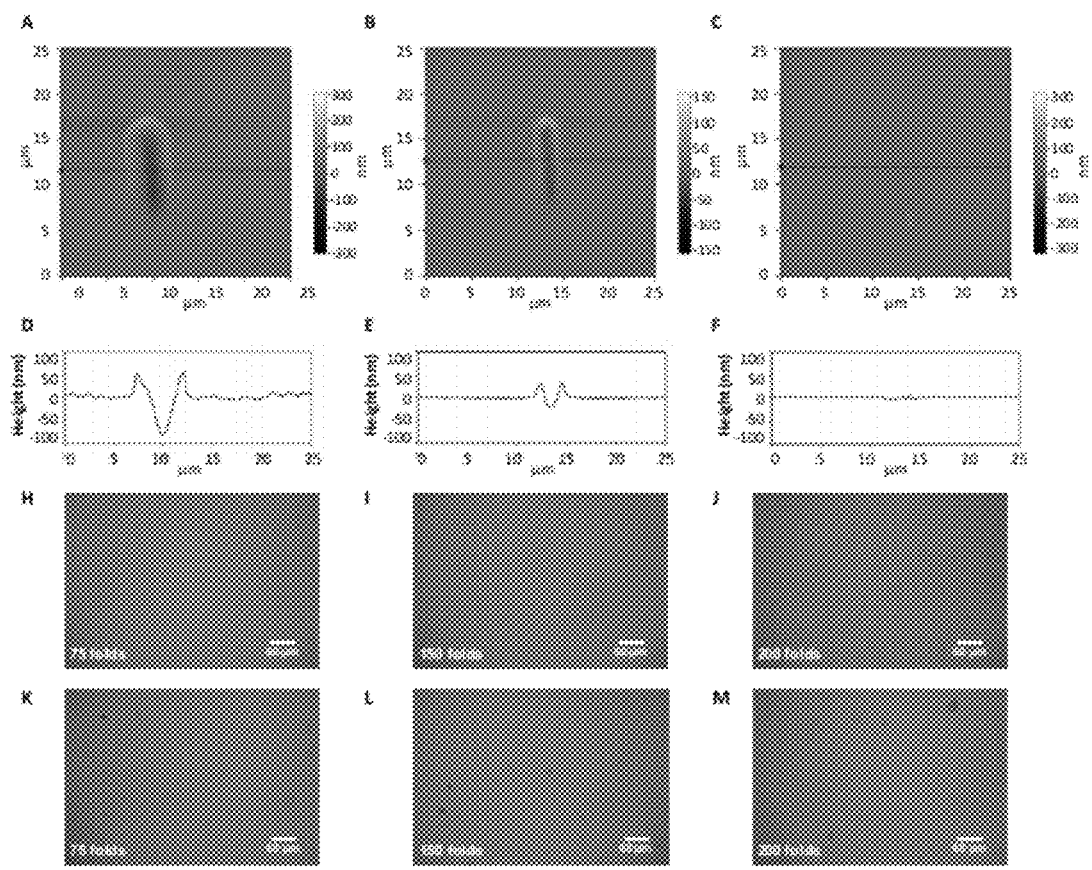
FIGS. 3A-3M depict scratch resistance and flexibility studies of various coating of the present invention.

Nanoscratch experiments were performed on polystyrene (PS), as-deposited PASMa, and 24-hr annealed PASMa copolymer films. AFM images (3D-MFP, Asylum Research) show that the scratch on the as-deposited PASMa films is ~48 nm in height (FIGS. 3B and 3E) and is much shallower than the one on the PS substrate with a height of ~130 nm (FIGS. 3A and 3D). However, on the PASMa film that was annealed for 24 hours, there is hardly any scratch observable on the substrate (FIGS. 3C and 3F). The scratch depth is <6 nm with the surface roughness of ~3 nm. This achievement represents a significant advance in the fabrication of tough durable functional coatings.

The folding tests (±180°) were performed by creasing the polycarbonate (PC) substrate deposited with PASMa thin films of ~200 nm thickness. After each iteration the PC was flattened back to 0°. We observed both the as-deposited and 24-hr annealed copolymer films to be mechanically robust to severe mechanical deformations on PC substrates (FIGS. 3H-3M). After 75 flexing cycles, the as-deposited PASMa was minimally affected (FIG. 3H), but more cracks appeared after 150 cycles (FIG. 3I). In contrast, after annealing for 24 hrs, PASMa films displayed no cracks even after 200 flexing cycles (FIGS. 3K-3M). The results indicate that the cross-linked films are mechanically strong but still maintain their flexibility, neither cracking nor delaminating with repeated flexing. All the experimental conditions in the nanoscratch and folding experiments were kept identical. The PASMa copolymer film thickness is ~1 micron in (B), (C), (E), (F) and ~200 nm in (H)-(M).

Figure 4:
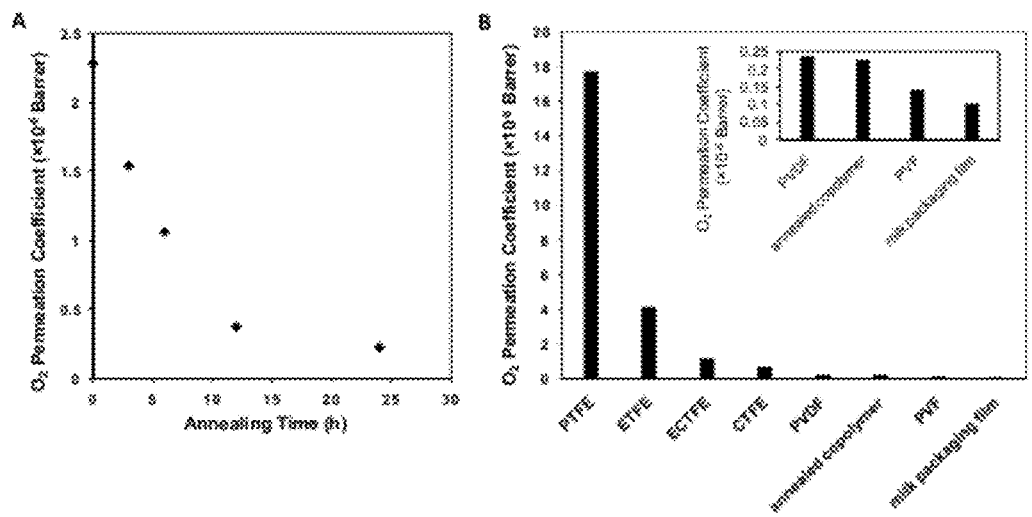
FIGS. 4A and 4B represent oxygen permeability measurements of various coatings of the present invention, as compared to commercially available permeation barrier films.

The oxygen permeation rates of PASMa copolymer thin films were investigated. The measured oxygen permeability coefficient for uncoated PDMS substrate was 42 Barrers. As shown in FIG. 4A, the permeability coefficient for a PDMS membrane (25 μm) coated with a 200 nm thick PASMa copolymer decreased to $2.3 \times 10^{-6}$ Barrers, more than 7 orders of magnitude lower than the bare PDMS. It can also be seen that the permeability coefficient decreased with longer annealing time, which is as expected since more amine groups react with anhydride functionalities, increasing cross-link density.

The low oxygen permeation rates of these films are attributed to a dense structure induced by extensive cross-linking as well as the good adhesion between the organic coating layer and PDMS substrate. The 24-hr annealed PASMa thin film has an oxygen permeability of $2.3 \times 10^{-7}$ Barrers, much lower than many of the fluoropolymers (FIG. 4B). (Fitz, H. *Kunststoffe-German Plastics* 1980, 70, 27-33). It is even less permeable than the leading commercially available permeation barrier film, Kynar® PVDF, making it an attractive material for electronics packaging or food industries.

In summary, amine-functional alternating PASMa copolymer films were synthesized via iCVD for the first time. The retention of the pendant amine and anhydride chemical functionalities was confirmed by FTIR and XPS. The amine-rich alternating copolymer extensively self-cross-links after gentle heating and this dramatically increases the mechanical properties of the copolymer. The annealed nanocoatings display an elastic modulus exceeding 20 GPa in nanoindentation experiments, far greater than typical polymers (0.5-5 GPa). Additionally, the cross-linked films maintain their flexibility, neither cracking nor delaminating with repeated flexing. This achievement represents a significant advance in the fabrication of tough durable functional coatings. Furthermore, the highly cross-linked coating material has oxygen permeability lower than commercially available permeation barrier coatings, making it an attractive material for electronics or food industries.

INCORPORATION BY REFERENCE

All of the cited U.S. Patents, U.S. patent application publications, and PCT patent application publications designating the U.S., are hereby incorporated by reference in their entirety.

EQUIVALENTS

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto; the invention may be practiced otherwise than as specifically described and claimed.

What is claimed is:

1. A method of coating a substrate, comprising the steps of:
   placing a substrate on a stage in a vessel at a pressure; wherein said vessel comprises a heating filament; and the temperature of said stage may be regulated;
   introducing into the vessel a first gaseous monomer at a first flow rate, a second gaseous monomer at a second flow rate, and a gaseous initiator at a third flow rate, thereby forming a mixture; and
   heating said mixture with said heating filament, thereby depositing a coating of a substantially alternating copolymer on the substrate;
   wherein the first monomer is 4-aminostyrene; and the second monomer is maleic anhydride.

2. The method of claim 1, wherein said gaseous initiator is selected from the group consisting of hydrogen peroxide, alkyl peroxides, aryl peroxides, hydroperoxides, halogens and nonoxidizing initiators.

3. The method of claim 1, wherein said gaseous initiator is selected from the group consisting of tert-butyl peroxide, tent-amyl peroxide, and tert-butyl peroxybenzoate.

4. The method of claim 1, further comprising the step of annealing the substantially alternating copolymer for a period of time.

5. The method of claim 4, wherein the annealing step is at a temperature between about 50° C. and about 150° C.

6. The method of claim 4, wherein the annealing step is at a temperature between about 75° C. and about 125° C.

7. The method of claim 4, wherein the annealing step is at a temperature between about 95° C. and about 105° C.

8. The method of claim 4, wherein the period of time is between about 1 hour and about 50 hours.

9. The method of claim 4, wherein the period of time is between about 5 hours and about 45 hours.

10. The method of claim 4, wherein the period of time is between about 10 hours and about 40 hours.

11. The method of claim 4, wherein the period of time is between about 20 hours and about 30 hours.

12. The method of claim 4, wherein the period of time is between about 22 hours and about 28 hours.

13. The method of claim 1, wherein the pressure in the vessel is between about 100 mTorr and about 800 Torr.

14. The method of claim 1, wherein the pressure in the vessel is between about 250 mTorr and about 400 Torr.

15. The method of claim 1, wherein the pressure in the vessel is between about 500 mTorr and about 200 Torr.

16. The method of claim 1, wherein the pressure in the vessel is between about 750 mTorr and about 100 Torr.

17. The method of claim 1, wherein the first flow rate is between about 10 sccm and about 0.05 sccm.

18. The method of claim 1, wherein the first flow rate is between about 8 sccm and about 0.1 sccm.

19. The method of claim 1, wherein the first flow rate is between about 6 sccm and about 0.15 sccm.

20. The method of claim 1, wherein the second flow rate is between about 10 sccm and about 0.05 sccm.

21. The method of claim 1, wherein the second flow rate is between about 8 sccm and about 0.1 sccm.

22. The method of claim 1, wherein the second flow rate is between about 6 sccm and about 0.15 sccm.

23. The method of claim 1, wherein the third flow rate is between about 7 sccm and about 0.1 sccm.

24. The method of claim 1, wherein the third flow rate is between about 5 sccm and about 0.3 sccm.

25. The method of claim 1, wherein the third flow rate is between about 3 sccm and about 0.5 sccm.

26. The method of claim 1, wherein the temperature of the stage is between about 20° C. and about 80° C.

27. The method of claim 1, wherein the temperature of the stage is between about 30° C. and about 70° C.

28. The method of claim 1, wherein the temperature of the stage is between about 40° C. and about 60° C.

29. The method of claim 1, wherein the temperature of the heating filament is between about 100° C. and about 600° C.

30. The method of claim 1, wherein the temperature of the heating filament is between about 150° C. and about 450° C.

31. The method of claim 1, wherein the temperature of the heating filament is between about 200° C. and about 300° C.

* * * * *

UNITED STATES PATENT AND TRADEMARK OFFICE
CERTIFICATE OF CORRECTION

| | | |
|---|---|---|
| PATENT NO. | : 8,372,928 B2 | Page 1 of 1 |
| APPLICATION NO. | : 13/112489 | |
| DATED | : February 12, 2013 | |
| INVENTOR(S) | : Karen K. Gleason et al. | |

It is certified that error appears in the above-identified patent and that said Letters Patent is hereby corrected as shown below:

In the Specification

The paragraph in column 4, from lines 56-57, should read:

FIGS. 3A-<u>3F and 3H-</u>3M depict scratch resistance and flexibility studies of various <u>coatings</u> ~~coating~~ of the present invention.

Signed and Sealed this
Fourth Day of June, 2013

Teresa Stanek Rea
*Acting Director of the United States Patent and Trademark Office*